S. R. Windle.
Measure for Cutting Dresses.
Nº 76,128.        Patented Mar. 31, 1868.
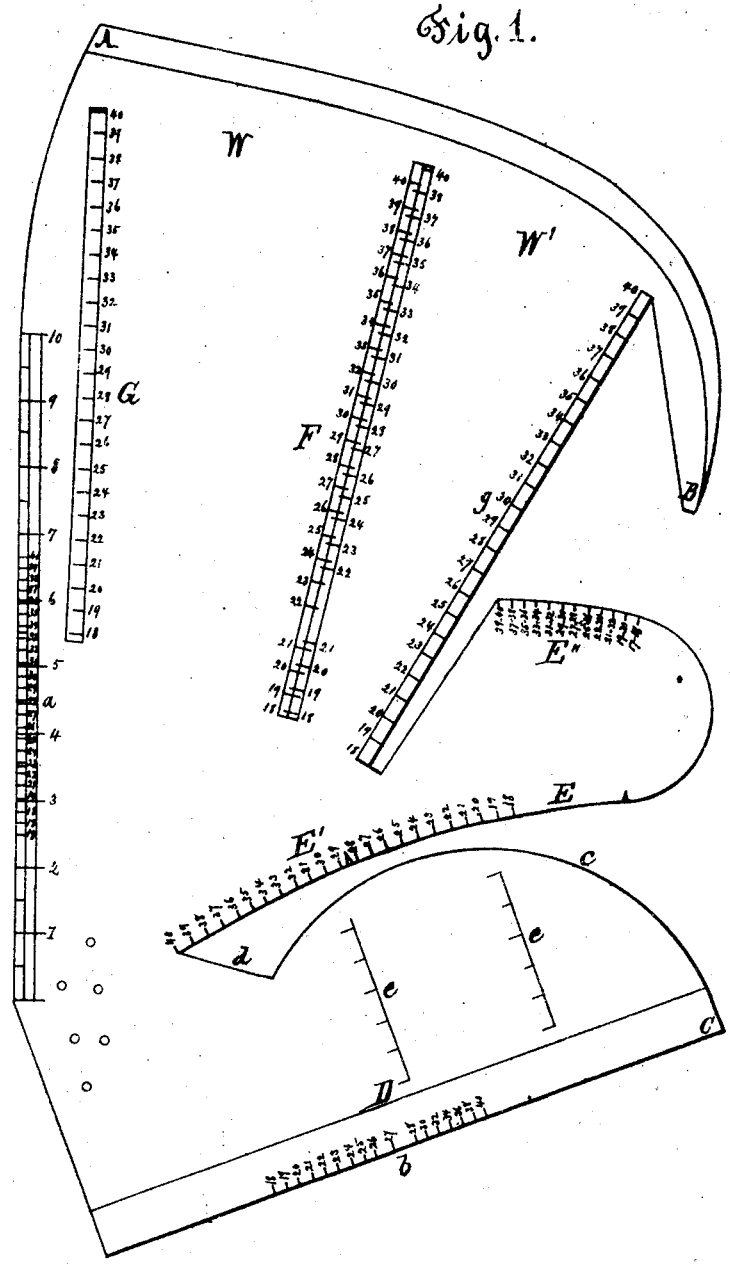
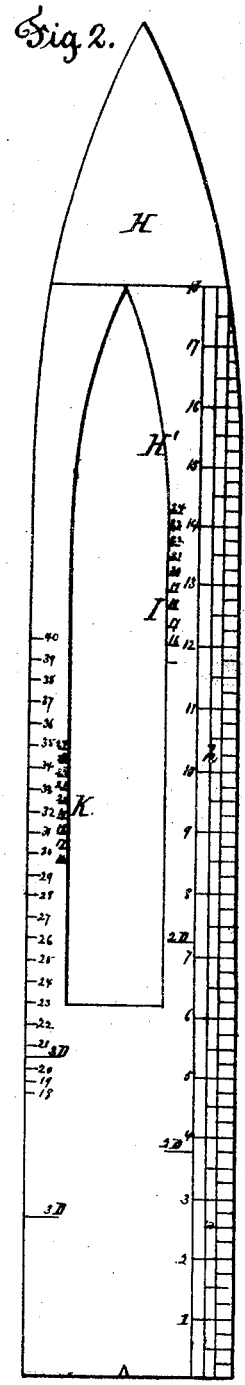
Witnesses.
W. A. Gage
Chas. Brown
Inventor.
Susan R. Windle

United States Patent Office.

SUSAN R. WINDLE, OF CHILLICOTHE, OHIO.

Letters Patent No. 76,128, dated March 31, 1868.

IMPROVEMENT IN MEASURES FOR CUTTING DRESSES.

The Schedule referred to in these Letters Patent and making part of the same.

TO ALL WHOM IT MAY CONCERN:

Be it known that I, SUSAN R. WINDLE, of Chillicothe, in the county of Ross, and the State of Ohio, have invented a new and improved Method of Cutting Dresses for Ladies and Misses, of which the following is a full and clear description, reference being had to the accompanying drawings, making part of this specification. In the drawings—

Figure 1 represents the pattern or chart having scales of parts marked thereon.

Figure 2 is the combined dart, points, and rule accompanying said chart.

The nature of my invention consists in presenting upon a chart and accompanying "dart-points" scales of measurement for various parts of the female form, adapted equally to the adult and child.

The curved upper edge of the chart, fig. 1, extending from A, the left-hand corner to the extreme right, at B, serves to mark out from, the back and low-neck forms, sacks, &c. Part of the left edge of the chart is provided with a scale, $a$, for the width of back. The bottom edge of the chart, denominated the "front line," is provided with a scale, $b$, marked from eighteen to forty. From the right-hand lower corner of the chart at C, on the "front line," commences the circle $c$ for the neck for ladies. It extends some distance to the left, and is terminated by the short line $d$. A line, D, is parallel to the "front line" on the chart. The circle for the neck of children is taken to the point of intersection of the line D and the circle $c$. On the chart, between the line D and the circle, are exhibited parallel scales, $e$ and $e'$, for the measurement of the breasts and shoulders of children. The most of the slightly-curved line E, which extends from the end of the short line $d$ to the right, has the scale E', marked from forty to eighteen. Points on this line marked $f$ and $f'$ give the back-arm sizes. The front-arm sizes are obtained from the scale E'', which is laid out on the continuation of the curved line E. The right-hand edge of the chart has a scale, $g$, of twenty-two parts, ranging from eighteen to forty, inclusive. Between the scales $g$ and $a$ on the face of the chart are the scales F and G, each of which is divided into twenty-two parts. The front and back wings of the chart are designated by the letters W W'. The "dart-point" H, for adults, has the scale divided into equal parts, extending nearly the entire length of the right-hand edge, as shown in fig. 2. This scale $h$ is marked from one to eighteen, inclusive. Upon the same scale are spaced the distances, marked 2 D. Upon the opposite edge distances marked 3 D are located. These distances are for measuring the bottom of waists. A scale, $k$, its subdivisions marked between eighteen and forty, occupies part of the left-hand side of the "dart-point" H. For children, the "dart-point" H' may be cut out of the dart-point H, being smaller. It is provided with scales I K, each divided between the marks sixteen and twenty-four.

To enable those not skilled to make use of my improved method of cutting dresses, I will proceed to give a full description thereof.

After holding the selvedge edges of the lining together, and turning a line of one and a half inch, if open in front, and one-half to three-fourths of an inch, if open in the back, then place the "front line" of the chart even with the edge of the cloth, dot at 27, on the front line at B, in front neck at 27, on each side of front wing. Place A, the shoulder-point, at the dot made on the upper side of wing, and draw a line to the upper dot at B on front neck. This forms the shoulder. Next draw the neck by the circular form, place the corner C, the dot made at 27 in the scale of the front line, and line up the front neck; then place 27 on the arm-size opposite the lower dot, and draw a line from 27 to 27. Lay a measure under the arm-circle and dot at eight inches. Now lay a straight-edge across to the front edge, and draw a line; then another, two inches below, beyond the dart, and slope it into the line first mentioned. This is to cut by. Place the one and three-fourth notch in the square end of the rule, under the arm and dot, and then lay the rule straight from that dot to the front edge, and dot there. Place the one and three-fourths inch notch at the front dot, and line from the under-arm dot to the front edge on the lower side of the rule. Before moving the rule, dot at each mark made for darts on the rule. Next, place the dart-point at the dot and line on each side, allowing one-half inch from the hem and one-half an inch between the darts on the straight line. Place the square end of the rule at the last dart; then line and dot at 22. Place the shoulder-point A at lower-arm size, dot, and line down to the dot made at 22. This forms the under-arm seam.

What I claim as new and of my invention, and desire to secure by Letters Patent, is—

1. The chart, provided with scales of part on its edges and surfaces, and of the herein-described contour, for the purpose of facilitating the cutting of dress-patterns, as specified.

2. The dart-point H and inner dart-point H′ of smaller dimensions and scales upon their edges for the measuring the parts of the pattern cut out, substantially as and for the purpose set forth.

SUSAN R. WINDLE.

Witnesses:
    W. A. GAGE,
    CHAS. P. BROWN.